No. 892,055. PATENTED JUNE 30, 1908.
E. R. HURD.
NUT LOCK.
APPLICATION FILED APR. 22, 1907.
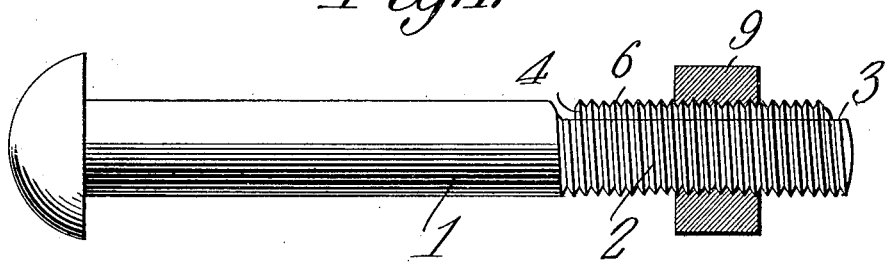
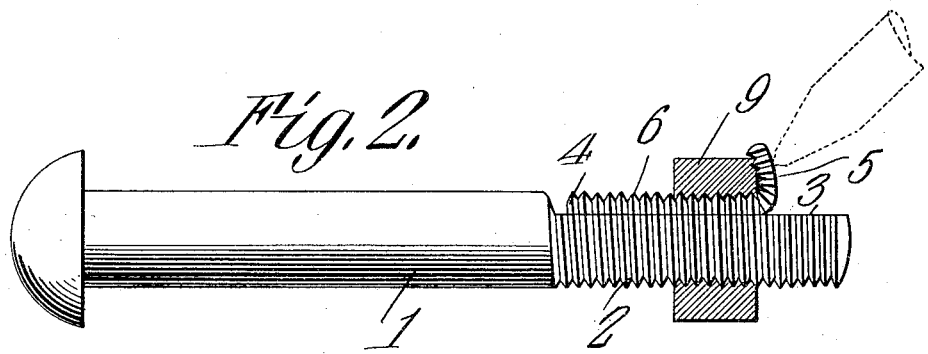
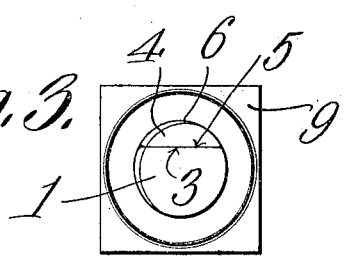
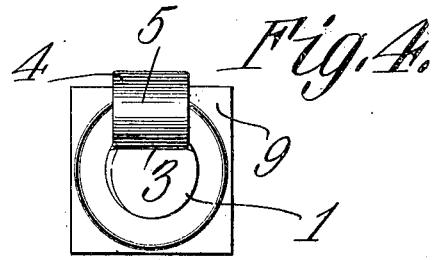
WITNESSES:
Ellis R. Hurd,
INVENTOR.
By C. A. Snow & Co.
ATTORNEYS

UNITED STATES PATENT OFFICE.

ELLIS RHEA HURD, OF CHICAGO, ILLINOIS.

NUT-LOCK.

No. 892,055.  Specification of Letters Patent.  Patented June 30, 1908.

Application filed April 22, 1907. Serial No. 369,585.

*To all whom it may concern:*

Be it known that I, ELLIS RHEA HURD, a citizen of the United States, residing at Chicago, in the county of Cook and State of Illinois, have invented a new and useful Nut-Lock, of which the following is a specification.

This invention relates to a nut lock of that type which has a threaded separable key which locks the nut when the outer end of said key is bent upwards.

The object of the invention is to provide a simple, cheap and secure means for locking a nut on a bolt after the nut has been screwed up as far as it will go by flattening one side of the threaded portion of the bolt and applying to said flattened portion, a key flat on one side and threaded on the other, said threads having the same pitch as the threads on the bolt. The projecting end of the key, after the nut has been turned to its limit, is then bent up against the outer face of the nut and locks it against backward movement.

In the accompanying drawings:—Figure 1 is a view of the invention, before the key has been bent up, the nut being shown in section. Fig. 2 is a similar view, showing the outer end of the key bent up to lock the nut in place. Figs. 3 and 4 are end views, respectively of Figs. 1 and 2.

Similar numerals of reference indicate the same parts on all the figures.

The bolt 1 is of ordinary form and construction with the exception of the threaded end 2 which has one side removed to form a flat surface 3, on which is placed a key 4 having a flattened side 5 to rest on the flat surface 3 of the bolt, and a curved side 6 the radius of which is the same as that of the bolt and provided with threads of the same pitch. The length of key 4 is indeterminate, the only requirement necessary is that it shall be longer than the thickness of the nut, and its width is that of the flat surface 3. The keys are to be made by a stamping press or other machine which shapes the key, forms the threads thereon and cuts it to the required length. As thus made the expense is very small, the only other expense attending the manufacture of the nut lock is that of flattening one side of the bolt which can be done by a machine very quickly and cheaply. The nut used requires no change and may have any shape desired.

The key is preferably made of a metal softer than the bolt but this is not required as the same metal as that of the bolt can be used.

After the bolt has been put in position, the key 4 is placed on the flat side of the bolt and the nut 9 screwed on over the bolt. The key having the same thread as the bolt, the nut can be run on as easily as on a continuous thread. When the nut is tightened the outside end of the key is turned up and if necessary riveted by a tool as shown in Fig. 2.

By making the flattened surface wide a better seat for the key is obtained and when the key is turned up it holds the bolt against any possible turning. The nut may be removed by straightening the key and rotating the nut in reverse direction. The key may also be used several times before its value is destroyed.

Having thus described the invention what is claimed is:—

A nut lock comprising a bolt having a smooth flat face on one side of its threaded portion, and a separable locking key substantially as long as the threaded portion of said bolt and as wide as its flat face, said key being made of hard metal and having two sides only, one side curved and having thereon throughout its entire length threads of the same radius and pitch as the threads on the bolt, the other side flat and adapted to be placed against the flat face of the bolt the threads on the key and the bolt thereby forming a continuous thread for a nut, the projecting end of said key being turned up against the nut to lock the latter on the bolt.

In testimony that I claim the foregoing as my own, I have hereto affixed my signature in the presence of two witnesses.

ELLIS RHEA HURD.

Witnesses:
J. G. BARNETT,
AUBREY G. S. MORRIS.